Aug. 18, 1964     T. W. MARTINEK     3,144,921
ELECTROFLUID COUPLING
Filed Dec. 30, 1960
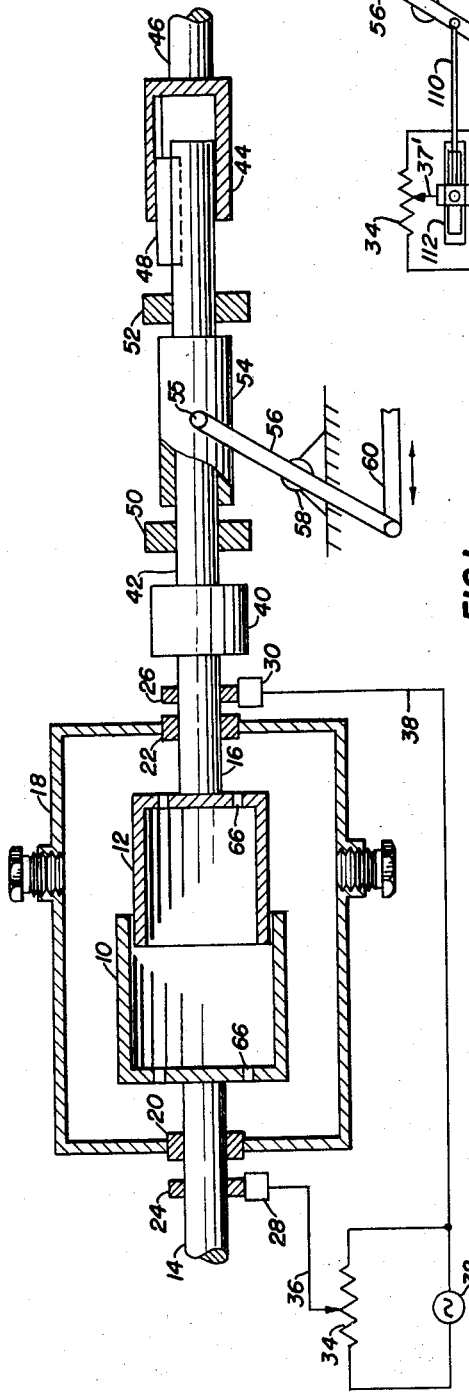
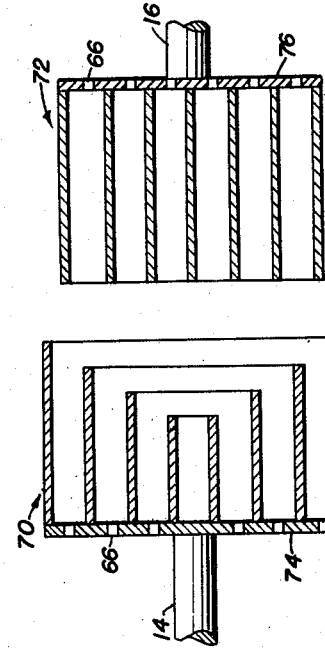
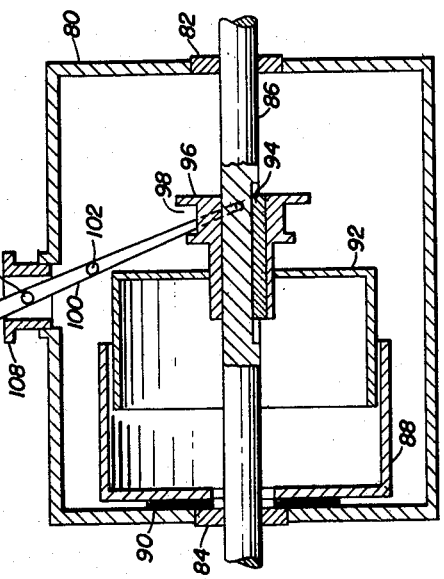
INVENTOR.
THOMAS W. MARTINEK
BY
ATTORNEY United States Patent Office 3,144,921
Patented Aug. 18, 1964

3,144,921
ELECTROFLUID COUPLING
Thomas W. Martinek, Crystal Lake, Ill., assignor to The Pure Oil Company, Chicago, Ill., a corporation of Ohio
Filed Dec. 30, 1960, Ser. No. 79,841
2 Claims. (Cl. 192—21.5)

This invention is directed to an electrofluid coupling. More particularly, this invention is directed to an electrofluid coupling in which the clutching surfaces are cylindrical, one being disposed within the other, and axially movable relative thereto.

Electrofluid couplings, which include clutching and braking devices, are known in the art and commonly comprise two plates separated by a dielectric fluid which contains a finely divided polar or polarizable solid. Such fluids tend to undergo dramatic changes of viscosity under the influence of an imposed electrical potential. Thus an electrofluid, which is a thin liquid in the absence of an electric potential, becomes a very viscous or semi-solid material under the influence of an intense electrical field. The compositions of such fluids and their properties are known in the art, as exemplified by U.S. Patent No. 2,661,825. These fluids themselves form no part of the instant invention.

The change in consistency which these fluids undergo under the influence of an electric field may be utilized in a clutch arrangement to cause a power-driven disc to rotate a second free disc, and thereby transmit torque through the coupling. The torque transmitted by the coupling is dependent upon the nature of the fluid, the distance between the discs, the area of the discs, and the magnitude of the potential imposed between the discs. The coupling torque is conventionally varied by increasing or decreasing the applied potential. However, there are several problems associated with these couplings, the principal difficulty being deterioration of the electrofluid, and undesirable permanent viscosity changes caused by the heat generated in the fluid by the rotating discs, especially while the clutch is idling.

It is an object of this invention to provide a new electrofluid coupling wherein the magnitude of torque transmitted by the coupling is varied by moving one of the coupling members relative to the other.

Another object of this invention is to provide a coupling that can be completely disengaged, and is not subject to residual viscosity effects of the electrofluid. Yet another object of this invention is to provide a coupling in which the deleterious effects of heat accumulation, and the build-up of heat itself are minimized.

The objects of this invention are accomplished by providing coupling members in the form of cylindrical surfaces, coaxially disposed, one within the other, and adapting one member for axial movement relative to the other. Thus the amount of torque transmitted by the clutch is dependent upon the distance to which the inner clutch member extends within the outer clutch member. The device comprises an electrically conductive, cylindrical, first clutch member, and an electrically conductive, cylindrical second clutch member supported in rotatable, axially aligned relation therewith. The exterior walls of the second clutch members are spaced a suitable distance from the interior wall of the first clutch member, with one of the clutch members being mounted coaxially on an input shaft, and the other member being mounted coaxially upon an output shaft. Means for axially moving one of the members is provided to vary the distance over which the inner and outer members overlap, and thus the extent of the clutching surface. Electrofluid fills the annular space between the first and second members. Means are provided for imposing an electrical potential between the first and second members, thereby activating the electrofluid.

The invention may best be described with reference to the drawings, of which:

FIGURE 1 is a sectional view of a coupling constructed in accordance with this invention.

FIGURE 2 is a sectional view of an alternate and preferred construction of the coupling members.

FIGURE 3 is a sectional view of a coupling constructed to act as a braking device.

FIGURE 4 is a diagrammatic view showing a modification for varying electrical potential in concert with movement of a clutch member.

Referring to FIGURE 1, cup-shaped clutch members 10 and 12 are supported by shafts 14 and 16, respectively. Shafts 14 and 16 are supported by housing 18 through bearings 20 and 22, which bearings support the shafts in electrically insulated relationship from the housing. Slip-rings 24 and 26, on shafts 14 and 16 respectively, are engaged by contact brushes 28 and 30, the coupling members being thereby connected to a potential source. The potential source may comprise an A.C. or D.C. generator 32 and a voltage output control such as potentiometer 34. Brush 28 is connected by line 36 to movable contact 37 and brush 30 is connected by line 38 to the generator 32 and potentiometer 34. The generator and voltage control should be capable of providing voltages in the range of 0–3,000 volts.

The potential applied across the clutch cylinders may be adjusted by means of potentiometer 34 to any desired value. Shaft 16 is connected, through electrically insulating connector 40, to keyed shaft 42, which mates with the cup-shaped portion 44 of output shaft 46, is slidable therewith, and connected thereto for the transmission of torque by means of key 48. Shaft 42 is equipped with two thrust bearings, 50 and 52, between which is located sleeve 54 through which shaft 42 rotates freely.

Clutch members 10 and 12 become engaged to a greater or lesser extent as clutch member 12, together with supporting shaft 16, slides axially back and forth in bearing 22. Non-rotating sleeve 54, together with ball-and-socket 55, lever arm 56, fulcrum 58, and rod 60, provide the means by which the position of clutch member 12 can be altered. It is evident that movement of rod 60 alters the position of clutch member 12 relative to clutch member 10. The torque-transmitting capability of the coupling is thereby varied. The travel of clutch member 12 is preferably sufficient so that it can be completely inserted within or completely withdrawn from clutch member 10. In the former position, maximum torque transmission is obtained, while in the latter, the clutch becomes completely disengaged, the clutching elements being so separated as to reduce the residual effects of electrofluid viscosity, and also the buildup of heat through internal friction, to a negligible value.

In operation, cylinder 12 is withdrawn completely from within clutch member 10 to reduce the power transmitted through the clutch substantially to zero. The torque transmitted is increased, while (if desired) maintaining constant the electrical potential applied across the members, by moving clutch member 12 to a position within clutch member 10 such that a substantial overlapping of the clutching surfaces is achieved. It is evident that the magnitude of the torque transmitted is directly proportional to the length of overlap. The radial thickness of the annular space between the clutching members and the magnitude of the applied potential are preferably adjusted so that the coupling will transmit its rated torque when clutch member 12 is entirely within clutch member 10. Holes 66 may be provided in the exterior disc-like walls of the members illustrated to permit free movement of fluid as clutch member 12 is advanced into or withdrawn from clutch member 10.

Referring to FIGURE 2, a preferred clutch-member design is shown. Each of the members, 70 and 72, comprise a plurality of coaxial tubes supported from one end by disc-like webs 74 and 76. The spacing of the circular tubes is such that member 72 is insertable within member 70, in a manner analogous to the members 10 and 12 of FIGURE 1. This design permits great clutching area to be obtained with clutching members of minimum dimensions. It is preferred that the radial thickness of the annular space between mating clutch surfaces be about 0.005 to 0.020 inch when member 72 lies within member 70 in operating position. It should be understood that the mating surfaces of the clutching members need not be true cylinders. For example, the surfaces may be constructed with a slight taper so that as the members mate, the annular space between the cylinders decreases slightly as one member is moved towards the other. This taper may be such that when fully separated, the radial thickness of the annular space between mating surfaces may be about 0.020 inch. When the two members are fully engaged, the radial thickness of the annular space between the surfaces may be about 0.001 inch. The use of tapered surfaces results in a more rapid decrease in torque transmitted as the members are moved from engagement with each other.

Referring to FIGURE 3, an alternate coupling design intended to operate as a brake, is depicted. Housing 80 supports aligned bearings 82 and 84, through which shaft 86 extends. Cylindrical coupling member 88 is supported from housing 80 by means of electrically insulating spacer disc 90. This disc may be fabricated of a plastic insulating material such as Bakelite. Both the insulating disc 90 and coupling member 88 are provided with central axial openings adjacent bearing 84 to accommodate shaft 86. Coupling member 88 is supported in rigid, non-rotating relationship with the housing 80. Coupling member 92 is supported slidably on shaft 86, and is secured to the shaft against rotation by means of key 94. Thus coupling member 92 is slidable to and from engagement with coupling member 88. Coupling member 92 is provided with a flange 96 in which is cut a circular groove 98. Yoke arm 100 is forked at 102 to provide a yoke which engages circular groove 98, such that movement of the fork portion of yoke arm 100 compels movement of member 92 along shaft 86. Yoke arm 100 is pivoted at pin 104 to pin support plug 103, which in turn is supported by housing 80. In this manner a convenient means for moving member 92 into or out of engagement with member 88 is provided, such that shaft 86 may remain in fixed position.

It will be evident that numerous other mechanisms for actuating the coupling for greater or lesser engagement may be used, such that the relative position of the clutching members may conveniently be adjusted by an operator actuating control means outside of the housing. For instance, electromagnetic, pneumatic, or hydraulic devices may be used to move the clutching members. Movement of the clutching members may be arranged to correspond with increase or decrease of the electric potential applied to energize the coupling. This is illustrated in FIGURE 4, wherein rod 110 is pivotally connected at one end to lever arm 56 and at the other to a slide element carrying movable contact 37' forming part of the potentiometer 34. The slide element is adapted to slide in elongated slotted guide 112.

In FIGURE 3 the potential applied to coupling members 88 and 92 may be controlled by means of a potentiometer, and the potentiometer may be connected to yoke arm 100 to be actuated thereby. Thus, as the coupling members are brought into operating position, a corresponding electric potential may most conveniently be applied to members 88 and 92 by direct connection of one terminal to the housing itself, and connection of the other to member 88. The use of brushes or slip rings may thus be eliminated.

As has been stated, the coupling members need not be true cylinders, but may, for example, be tapered slightly to provide a variation in thickness of the annular space between the coupling members as one member is axially moved. Accordingly, the word "cylindrical" as used in this specification and the appended claims will be understood to include shapes of approximate cylindrical form, although they are not true geometric cylinders. It will be evident to those skilled in the art, that while the instant invention has been described with reference to an electrofluid, the apparatus may also be used with other field-responsive fluids. By "field-responsive fluid" is meant those fluids which display a substantial change in apparent bulk modulus upon exposure to the influence of a field, such as an electric or magnetic field. When the device is intended to operate using a magnetic-field-responsive fluid, rather than an electrofluid, it will be necessary to include in one or both of the coupling members means for producing a magnetic field. The coils for producing the magnetic field may be arranged as shown in Patent No. 2,661,596, to Willis M. Winslow.

The compositions of electrofluids and magnetic-field-responsive fluids are set out in detail in the above-named patent. Where magnetic-field-responsive fluids are employed, electric connections will be made to the magnet coils rather than to the clutching members themselves, as set forth in detail in the afore-named patent.

The embodiments of the invention in which an exclusive property or privilege is claimed are defined as follows:

1. An electrofluid coupling comprising a housing for retaining a field-responsive fluid, bearing means associated with said housing supporting an input shaft extending from within to without said housing, a first member disposed within said housing, said first member comprising a plurality of spaced, concentric, cylindrical tubes coaxially supported from one end to produce a plurality of annular spaces therebetween, a second member disposed within said housing, said second member comprising a plurality of spaced, concentric, cylindrical tubes coaxially supported from one end to produce a plurality of annular spaces therebetween, said members axially aligned, with the tubes of one said member being arranged to enter the annular spaces of the other said member, one said member being supported by said input shaft for rotation therewith, the other said member being supported by said housing in fixed relationship thereto, one said member being axially movable with respect to the other from a first position in which said tubes overlap, to a second position in which said tubes are axially separated, means for moving the one said member between the first and second positions, means including a potentiometer for controllably applying an eletric potential between said first and second members, and means mechanically linking said potentiometer to said means for moving the one said member, whereby the potential is varied in response to movement of said member.

2. An electrified coupling in accordance with claim 1 in which the shaft supporting said axially movable member is slidably supported in a bearing associated with said housing, and said means for moving said one member engages said shaft externally of said housing to slide said shaft relative to its supporting bearing.

References Cited in the file of this patent

UNITED STATES PATENTS

| | | |
|---|---|---|
| 1,238,447 | Severy | Aug. 28, 1917 |
| 2,575,360 | Rabinow | Nov. 20, 1951 |
| 2,838,244 | Oldberg | June 10, 1958 |
| 2,845,157 | Gambell | July 29, 1958 |
| 2,886,151 | Winslow | May 12, 1959 |

FOREIGN PATENTS 185,173  Australia _____ Apr. 10, 1956

OTHER REFERENCES

Contributed Original Research, Journal of Applied Physics, vol. 20, Issue 12, pages 1137–1140, December 1949.

Electrical Manufacturing, Research Notes (Electro Fluids for Power Transmission), vol. 63, February 1959, page 11.

UNITED STATES PATENT OFFICE
CERTIFICATE OF CORRECTION

Patent No. 3,144,921                          August 18, 1964

Thomas W. Martinek

It is hereby certified that error appears in the above numbered patent requiring correction and that the said Letters Patent should read as corrected below.

Column 4, line 73, for "electrified" read -- electrofluid --.

Signed and sealed this 8th day of December 1964.

SEAL)

test:

RNEST W. SWIDER                            EDWARD J. BRENNER
testing Officer                                  Commissioner of Patents